United States Patent [19]

Marosi et al.

[11] 4,300,911
[45] Nov. 17, 1981

[54] METHOD FOR PREPARING CRYSTALLINE SIO₂ MODIFICATION

[75] Inventors: Laszlo Marosi, Ludwigshafen; Joachim Stabenow, Weinheim; Matthias Schwarzmann, Limburgerhof, all of Fed. Rep. of Germany

[73] Assignee: BASF Aktiengesellschaft, Fed. Rep. of Germany

[21] Appl. No.: 124,988

[22] Filed: Feb. 27, 1980

[30] Foreign Application Priority Data

Mar. 14, 1979 [DE] Fed. Rep. of Germany ....... 2909930

[51] Int. Cl.³ .......................... C01B 33/12; B01D 9/00
[52] U.S. Cl. .................................... 23/300; 252/449; 423/335; 423/339
[58] Field of Search ................ 423/335, 339; 252/449; 156/623 R, 623 Q; 23/300, 295 R

[56] References Cited

U.S. PATENT DOCUMENTS 4,061,724 12/1977 Grose et al. ......................... 423/335
4,073,865 2/1978 Flanigen .............................. 423/339

FOREIGN PATENT DOCUMENTS 2751443 5/1979 Fed. Rep. of Germany .

*Primary Examiner*—Jack Cooper
*Attorney, Agent, or Firm*—Keil & Witherspoon

[57] ABSTRACT

A crystalline $SiO_2$—modification, which is characterized by an X-ray diffraction diagram having certain diffraction lines, and a process for the preparation of this crystalline $SiO_2$—modification by crystallizing reactive amorphous $SiO_2$ under hydrothermal conditions in the presence of hexamethylenediamine. Sodium ions, phosphate ions and/or sulfate ions may be added for the crystallization.

5 Claims, No Drawings

METHOD FOR PREPARING CRYSTALLINE SIO₂ MODIFICATION

A number of crystalline SiO₂-modifications are known. They are distinguished by many noteworthy properties. For example, an SiO₂-modification which exhibits molecular sieve properties is known. This SiO₂-modification is prepared in the presence of tetrapropylammonium hydroxide.

The present invention relates to a novel crystalline SiO₂-modification and to a process for its preparation.

The novel SiO₂-modification is characterized by an X-ray diffraction diagram which exhibits at least the following diffraction lines:

| d (Å) | I |
|---|---|
| 11.60 | 36 |
| 10.02 | 15 |
| 5.80 | 11 |
| 4.18 | 100 |
| 3.87 | 79 |
| 2.84 | 16 |

We have found that a novel crystalline SiO₂-modification which exhibits the above X-ray diffraction lines is obtained if a reactive amorphous SiO₂ is crystallized under hydrothermal conditions in the presence of hexamethylenediamine.

The process according to the invention may be carried out, for example, by treating a reactive amorphous SiO₂ with an aqueous solution of hexamethylenediamine at an elevated temperature. In general, depending on the reaction conditions, a mixture of two crystalline phases is obtained and after removal of the mother liquor this mixture consists of pure SiO₂. One of the modifications proves to be the analog, consisting of pure SiO₂, of the conventional ZSM-5 aluminosilicate zeolite, whilst the other modification has a novel crystal structure different from the latter.

In a particular embodiment of the process according to the invention, reactive amorphous SiO₂ is homogeneously stirred into an aqueous solution of hexamethylenediamine and the mixture is heated in a closed reaction vessel at from 100° to 200° C. for from ½ to 50 days. The preferred conditions are from 120° to 170° C. for from 0.5 to 7 days, more particularly from 140° to 160° C. for from 1 to 5 days.

Suitable starting materials are all amorphous reactive types of SiO₂, as well as various silicic acids. A suitable solvent is an aqueous solution, for example of 50 percent strength, of hexamethylenediamine. After crystallization, the product is filtered off, washed and dried. In this state, the product still contains substantial amounts of water and hexamethylenediamine. These may be removed by, for example, heating at from 100° to 900° C., preferably from 200° to 600° C. The material which remains then consists of pure SiO₂, as shown by its chemical analysis. The novel SiO₂-modification according to the invention is in many cases obtained as a mixture with the pure SiO₂ analog of the conventional ZSM-5 aluminosilicate zeolite. The d-values of the most important diffraction lines of the latter phase are as follows:

11.1/10.0/3.85/3.80/3.70/3.65/3.04/2.97/2.60/2.48/2.40/2.01/1.99.

By appropriately choosing the composition of the reaction mixture, the crystallization can be directed so that only, or predominantly, the novel crystalline SiO₂-modification is formed. We have found that small amounts of aluminum, boron or other metals, which are often present as impurities, favor the formation of the structure of the ZSM-5 type. Stirring or shaking during crystallization also affects the product composition.

Further, we have found that the presence of [PO₄] and/or [SO₄] anions together with sodium ions during this crystallization results in the novel SiO₂-modification according to the invention being obtained in a pure form. The product thus prepared always exhibits the diffraction lines listed in Table 1 below, and no other crystalline material is present. Chemical analysis indicates only slight amounts of [PO₄] or [Na] ions.

TABLE 1

| d (Å) | I |
|---|---|
| 11.60 | 36 |
| 10.02 | 15 |
| 5.80 | 11 |
| 4.18 | 100 |
| 3.87 | 79 |
| 2.84 | 16 |

The X-ray diffraction diagrams are recorded with an automatic Phillips APD-10 diffractometer. CuKα radiation is used. The values quoted are subject to the errors usual with this type of recording method. The accuracy of the d-values is about ±0.3 Å for small diffraction angles and from ±0.1 to ±0.05 Å for large diffraction angles. Table 1 shows only the most important d-values of the diffraction lines but these do allow an expert to characterize the novel modification clearly. A characteristic diffraction diagram which contains all the intense diffraction lines is set out in Table 2 below.

TABLE 2

| d (Å) | I | d (Å) | I |
|---|---|---|---|
| 11.60 | 36 | 3.56 | 6 |
| 10.02 | 15 | 3.40 | 5 |
| 7..08 | 5 | 3.35 | 7 |
| 6.05 | 6 | 3.06 | 3 |
| 5.80 | 11 | 2.84 | 16 |
| 4.18 | 100 | 2.09 | 8 |
| 3.87 | 79 | 2.07 | 4 |
| 3.60 | 4 | | |

The intensity of the diffraction lines may vary depending on the pre-treatment of the sample, for example by drying or calcining, but such variation does not make it more difficult to characterize the novel SiO₂-modification clearly.

The novel SiO₂-modification may in particular be used as a selective adsorbent, for example as a molecular sieve.

The Examples which follow illustrate the process according to the invention.

EXAMPLE 1

5 g of pyrogenic silica (Aerosil) are stirred homogeneously into 95 g of 42 percent strength aqueous hexamethylenediamine solution at 60° C. The mixture is then heated for 5 days in a steel autoclave at 150° C. under autogenous pressure whilst shaking the autoclave. The resulting crystalline product is filtered off, washed with distilled water and calcined overnight at 570° C. The X-ray diffraction analysis shows that the crystalline material consists of about 80% of the novel crystalline SiO₂-modification and about 20% of SiO₂ having the crystal structure of the ZSM-5 aluminosilicate zeolite. Chemical analysis shows that the product consists of pure $SiO_2$.

EXAMPLE 2

11 g of pyrogenic silica (Aerosil) are introduced into 118 g of 50 percent strength aqueous hexamethylenediamine solution at 60° C., and the mixture is homogenized. It is then heated for 5 days in a steel autoclave at 150° C. under autogenous pressure. The resulting crystalline product consists, according to X-ray diffraction analysis, of about 50% of the novel crystalline $SiO_2$-modification and about 50% of $SiO_2$ having the crystal structure of the conventional ZSM-5 aluminosilicate zeolite.

EXAMPLE 3

Three solutions are prepared. Solution 1 consists of 130 g of Aerosil, 47.6 g of NaOH and 783 g of water, solution 2 consists of 70 g of phosphoric acid in 712 g of water and solution 3 consists of 420 g of 50 percent strength aqueous hexamethylenediamine solution.

Solutions 3 and 2 are added to solution 1, whilst stirring, and the mixture is homogenized. It is then heated for 5 days at 150° C. under its autogenous pressure, whilst stirring in an autoclave. The crystalline product is filtered off, washed and dried. According to X-ray diffraction analysis, it consists entirely of the novel crystalline $SiO_2$-modification, having the diffraction lines indicated in Table 2.

EXAMPLE 4

6 g of $Na_2SO_4$ are added to a homogeneous mixture of 11.45 g of Aerosil and 118 g of 50 percent strength aqueous hexamethylenediamine solution, and the mixture is heated for 5 days at 150° C. in a shaken autoclave.

The resulting product contains more than 90% of the novel crystalline $SiO_2$-modification.

We claim:

1. A process for the preparation of a crystalline $SiO_2$-modification characterized by an X-ray diffraction diagram which exhibits at least the following diffraction lines:

| d (Å) | I |
|---|---|
| 11.60 | 36 |
| 10.02 | 15 |
| 5.80 | 11 |
| 4.18 | 100 |
| 3.87 | 79 |
| 2.84 | 16 | which process comprises heating a mixture of a reactive amorphous $SiO_2$ in an aqueous solution of hexamethylenediamine at a temperature of from 100° to 200° C. for from 0.5 to 50 days, to effect crystallization of the $SiO_2$ to said crystalline $SiO_2$-modification.

2. The process of claim 1 wherein (Na) ions and ($PO_4$) and/or ($SO_4$) ions are added to the mixture prior to crystallization.

3. The process of claims 1 or 2 wherein reactive amorphous $SiO_2$ is added to an aqueous solution of hexamethylenediamine prior to heating.

4. The process of claim 3 wherein the mixture is heated at a temperature of from 120° to 170° C. for from 0.5 to 7 days.

5. The process of claim 3 wherein the mixture is heated at a temperature of from 140° to 160° C. for from 1 to 5 days.

* * * * *